(12) United States Patent
Lillegard et al.

(10) Patent No.: US 6,174,284 B1
(45) Date of Patent: Jan. 16, 2001

(54) ULTRASOUND HARMONIC IMAGING TECHNIQUES

(75) Inventors: Gregory A. Lillegard; Steven G. Foster, both of Greenfield, WI (US)

(73) Assignee: General Electric Company, Milwaukee, WI (US)

( * ) Notice: Under 35 U.S.C. 154(b), the term of this patent shall be extended for 0 days.

(21) Appl. No.: 09/224,337

(22) Filed: Dec. 31, 1998

(51) Int. Cl.$^7$ .......................................... A61B 8/00

(52) U.S. Cl. ............................................... 600/443

(58) Field of Search ................... 600/458, 443, 600/447, 449, 448; 310/317

(56) References Cited

U.S. PATENT DOCUMENTS

| | | | |
|---|---|---|---|
| 4,714,846 | * 12/1987 | Pesque et al. | 310/317 |
| 5,924,991 | * 7/1999 | Hossack et al. | 600/443 |
| 5,971,928 | * 10/1999 | Dodd et al. | 600/458 |

* cited by examiner

*Primary Examiner*—Marvin M. Lateef
*Assistant Examiner*—Maulin Patel
(74) *Attorney, Agent, or Firm*—McAndrews, Held & Malloy; Christian G. Cabou; Phyliss Y. Price

(57) ABSTRACT

An ultrasonic imaging system for harmonic imaging includes a receiver which demodulates ultrasonic echo signals received by a transducer array and filters a band of fundamental frequencies from the echo signals by means of a notch filter. Images responsive to the filtered signals are presented on a display system.

18 Claims, 4 Drawing Sheets

ULTRASOUND HARMONIC IMAGING TECHNIQUES

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

This invention relates to acoustical imaging and, more specifically, relates to ultrasonic harmonic imaging.

Recently there has been a great deal of clinical interest in harmonic imaging for ultrasound. In harmonic imaging, second or higher order harmonics of the transmitted ultrasound's fundamental frequencies are processed.

Accordingly, there is a need for a reliable and accurate method and apparatus for enabling such imaging. This invention fills that need.

BRIEF SUMMARY OF THE INVENTION

The present invention is useful in an ultrasound system comprising a receiver connected to receive ultrasound echo signals from a subject under study. The echo signals comprise a first band of frequencies and one or more harmonics of the first band of frequencies. The preferred embodiment provides harmonic imaging in response to the echo signals firstly by receiving the echo signals. The first band of frequencies from the echo signals is filtered, preferably by a band pass analog filter. The filtered signals are processed, preferably by a processor. One or more images are displayed in response to the processed signals, preferably by a display system.

By using the foregoing techniques, ultrasound harmonic imaging can be provided with a degree of accuracy and ease previously unattained.

BRIEF DESCRIPTION OF THE DRAWINGS

FIGS. 2A and 2B are graphical representations of the signal in any of the channels of transmitter 50 of FIG. 2.

DETAILED DESCRIPTION OF THE INVENTION

Figure 1:
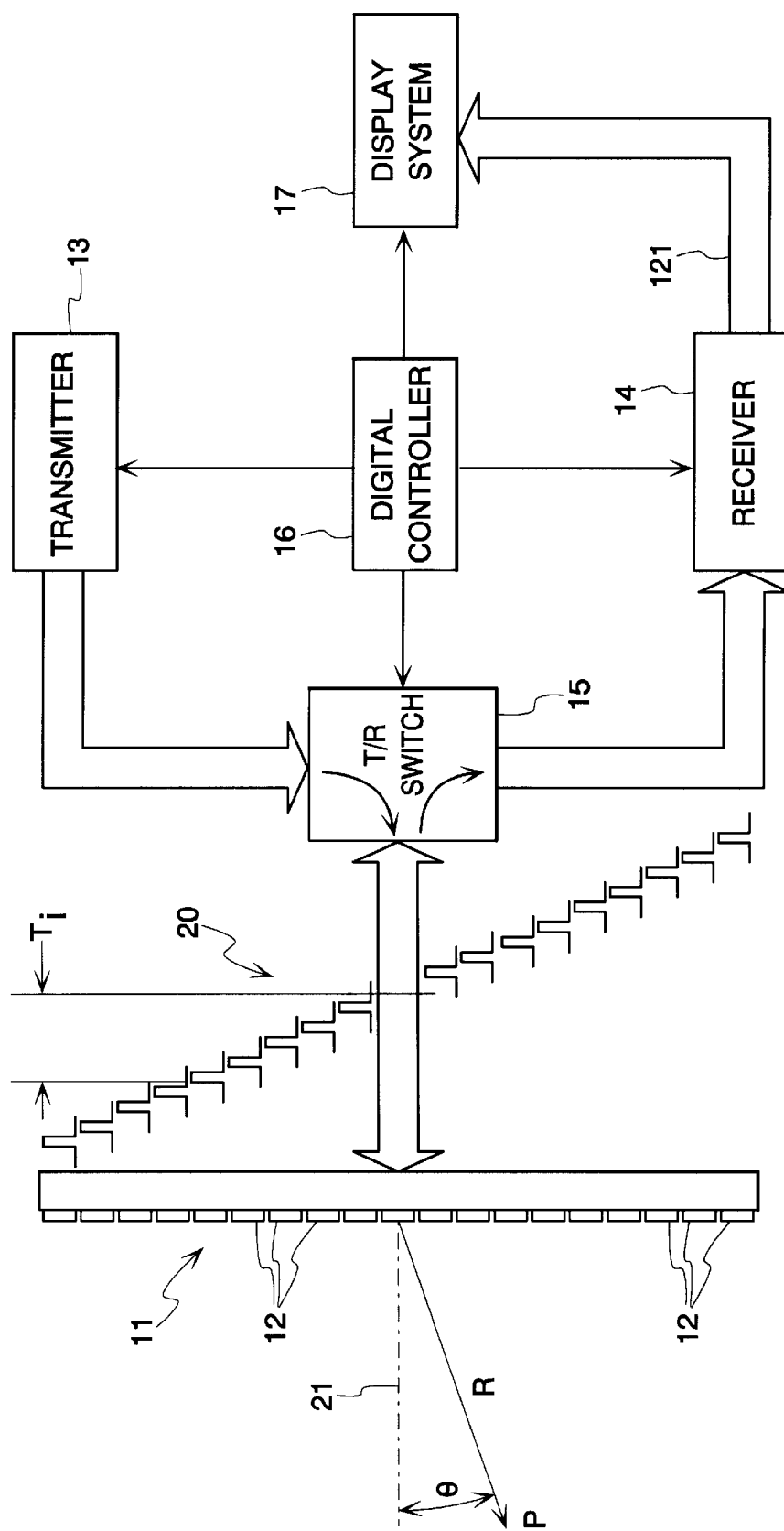
FIG. 1 is a schematic block diagram of an ultrasonic imaging system employing a preferred embodiment of the present invention.

Referring to FIG. 1, a vibratory energy imaging system includes a transducer array 11 comprised of a plurality of separately driven elements 12 which each produce a burst of ultrasonic energy when energized by a pulsed waveform produced by a transmitter 13. The ultrasonic energy reflected back to transducer array 11 from the subject under study is converted to an electrical signal by each transducer element 12 and applied separately to a receiver 14 through a set of transmit/receive (T/R) switches 15. Transmitter 13, receiver 14 and switches 15 are operated under control of a digital controller 16 responsive to commands by a human operator. A complete scan is performed by acquiring a series of echoes in which switches 15 are sent to their transmit position, transmitter 13 is gated on momentarily to energize each transducer element 12, switches 15 are then set to their receive position, and the subsequent echo signals produced by each transducer element 12 are applied to receiver 14. The separate echo signals from each transducer element 12 are combined in receiver 14 to produce a single echo signal which is employed to produce a line in an image on a display system 17.

Transmitter 13 drives transducer array 11 such that the vibrational energy produced, e.g., ultrasonic energy, is directed, or steered, in a beam. A B-scan can therefore be performed by moving this beam through a set of angles from point-to-point rather than physically moving transducer array 11. To accomplish this, transmitter 13 imparts a time delay $(T_i)$ to the respective pulsed waveforms 20 that are applied to successive transducer elements 12. If the time delay is zero $(T_i=0)$, all the transducer elements 12 are energized simultaneously and the resulting ultrasonic beam is directed along an axis 21 normal to the transducer face and originating from the center of transducer array 11. As the time delay $(T_i)$ is increased as illustrated in FIG. 1, the ultrasonic beam is directed downward from central axis 21 by an angle θ. The relationship between the time delay $T_i$ applied to each $i^{th}$ signal from one end of the transducer array (i=1) to the other end (i=n) is given by the following relationship:

$$T_i = R_T/c - \sqrt{(R_{T/c})^2 + (x/c)^2 - 2xR_T \sin\theta/c^2} \quad (1)$$

where:

x=distance of center of transducer element 12 from center of transducer array;

θ=transmit beam angle, c=velocity of sound in the object under study, and $R_T$=range at which transmit beam is focused.

The time delays $T_i$ in equation (1) have the effect of steering the beam in the desired angle θ, and causing it to be focused at a fixed range $R_T$. A sector scan is performed by progressively changing the time delays $T_i$ in successive excitations. The angle θ is thus changed in increments to steer the transmitted beam in a succession of directions. When the direction of the beam is above central axis 21, the timing of pulses 20 is reversed, but the formula of equation (1) still applies.

Referring still to FIG. 1, the echo signals produced by each burst of ultrasonic energy emanate from reflecting objects located at successive positions (R) along the ultrasonic beam. These are sensed separately by each segment 12 of transducer array 11 and a sample of the magnitude of the echo signal at a particular point in time represents the amount of reflection occurring at a specific range (R). Due to the differences in the propagation paths between a reflecting point P and each transducer element 12, however, these echo signals will not occur simultaneously and their amplitudes will not be equal. The function of receiver 14 is to amplify and demodulate these separate echo signals, impart the proper time delay and phase shift to each and sum them together to provide a single echo signal which accurately indicates the total ultrasonic energy reflected from point P located at R along the ultrasonic beam oriented at the angle θ.

To simultaneously sum the electrical signals produced by the echoes from each transducer element 12, time delays and phase shifts are introduced into each separate transducer element channel of receiver 14. The beam time delays for reception are the same delays ($T_i$) as the transmission delays described above. However, in order to dynamically focus, the time delay and phase shift of each receiver channel is continuously changing during reception of the echo to provide dynamic focusing of the received beam at the range R from which the echo signal emanates. The exact equation for the time delay $T_d$ imposed on the signal received by each transducer element is as follows:

$$T_d = t/2 - \sqrt{(t/2)^2 + (x/c)^2 - (xt/c)\sin(\theta)} \quad (2)$$

t=elapsed time after transmission of sound from center of transducer array (i.e., START),
c=velocity of sound in the object under study,
θ=beam angle, and
x=distance of center of element from center of transducer array.

The same calculation, suitably scaled, also provides the correct phase shift.

Under direction of digital controller 16, receiver 14 provides delays during the scan such that steering of receiver 14 tracks with the direction θ of the beam steered by transmitter 13 and it samples the echo signals at a succession of ranges R and provides the proper delays and phase shifts to dynamically focus at points P along the beam. Thus, each emission of an ultrasonic pulse waveform results in the acquisition of a series of data points which represent the amount of reflected sound from a corresponding series of points P located along the ultrasonic beam.

Display system 17 receives the series of data points produced by receiver 14 and converts the data to a form producing the desired image. For example, if an A-scan is desired, the magnitude of the series of data points is merely graphed as a function of time. If a B-scan is desired, each data point in the series is used to control brightness of a pixel in the image, and a scan comprised of a series of measurements at successive steering angles (θ) is performed to provide the data necessary for display.

Figure 2:
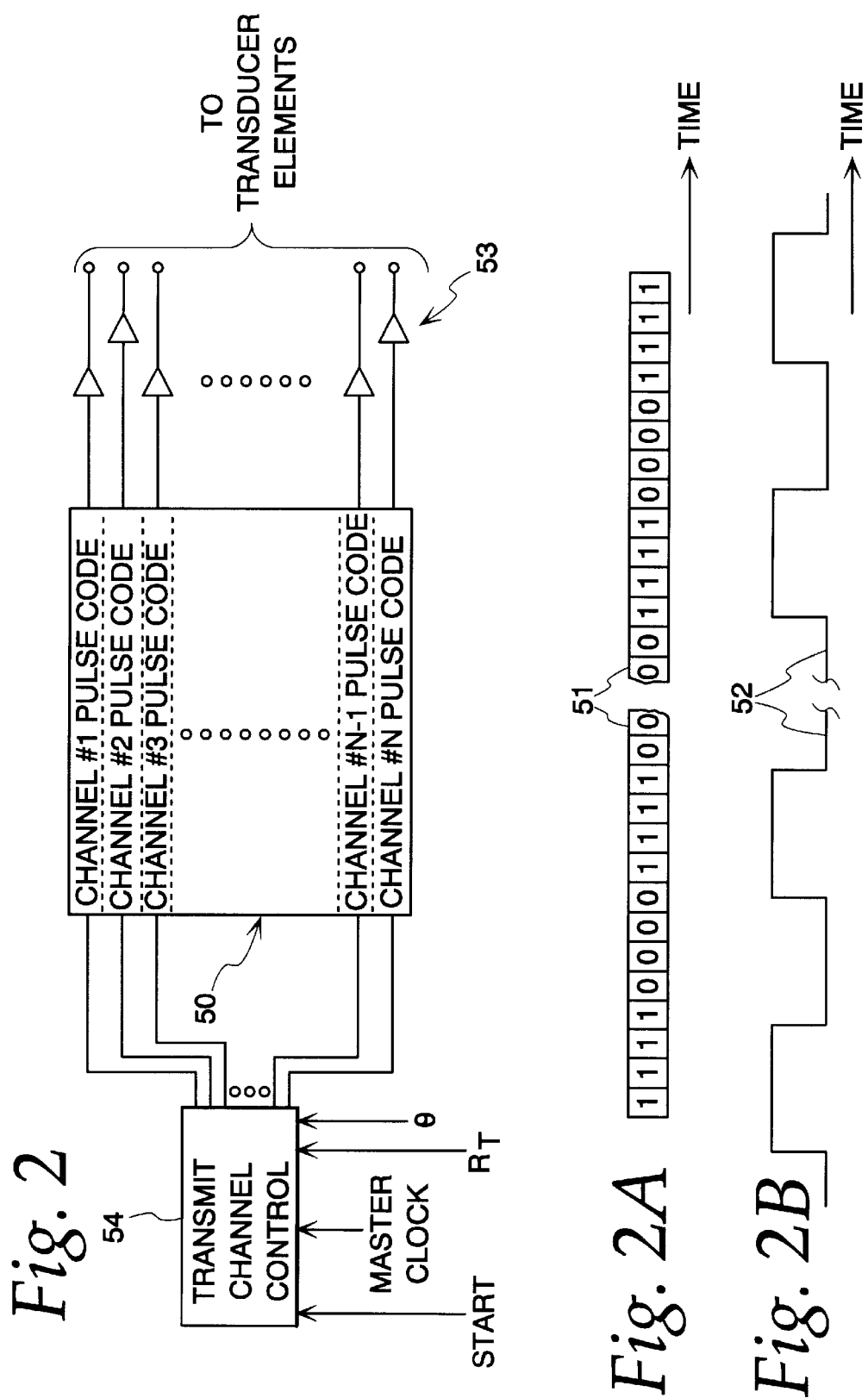
FIG. 2 is a schematic block diagram of a transmitter which forms part of the system of FIG. 1.

Referring to FIG. 2 in conjunction with FIG. 1, transmitter 13 includes a set of channel pulse code memories indicated collectively as memories 50. In the preferred embodiment there are 128 separate transducer elements 12, and therefore, there are 128 separate channel pulse code memories 50. Each pulse code memory 50 is typically a 1-bit by 512-bit memory which stores a bit pattern 51 that determines the frequency of the ultrasonic pulse 52 to be produced. In the preferred embodiment, this bit pattern is read out of each pulse code memory 50 by a 40 MHz master clock and applied to a driver 53 which amplifies the signal to a power level suitable for driving transducer 11. In the example shown in FIG. 2a, the bit pattern is a sequence of four "1" bits alternated with four "0" bits to produce a 5 MHz ultrasonic pulse 52; however, other carrier frequencies ($F_0$) may be employed in the preferred embodiment, such as 2.5, 3.75, 6.25, 7.5, 8.75 and 10 MHz. Transducer elements 12 to which these ultrasonic pulses 52 are applied respond by producing ultrasonic energy. If all 512 bits are used, a pulse of bandwidth as narrow as 40 kHz centered on the carrier frequency (i.e. 5 MHz in the example) will be emitted.

As indicated above, to steer the transmitted beam of the ultrasonic energy in the desired direction (θ), pulses 52 for each of the n channels, such as shown in FIG. 2B, must be delayed by the proper amount. These delays are provided by a transmit control 54 which receives four control signals (START, MASTER CLOCK, $R_T$ and θ) from digital controller 16 (FIG. 1). Using the input control signal θ, the fixed transmit focus $R_T$, and the above equation (1), transmit control 54 calculates the delay increment $T_i$ required between successive transmit channels. When the START control signal is received, transmit control 54 gates one of four possible phases of the 40 MHz MASTER CLOCK signal through to the first transmit channel 50. At each successive delay time interval ($T_i$) thereafter, the 40 MHz MASTER CLOCK signal is gated through to the next channel pulse code memory 50 until all n=128 channels are producing their ultrasonic pulses 52. Each transmit channel 50 is reset after its entire bit pattern 51 has been transmitted and transmitter 13 then waits for the next θ and next START control signals from digital controller 16. As indicated above, in the preferred embodiment of the invention a complete B-scan is comprised of 128 ultrasonic pulses steered in Δθ increments of 0.70° through a 90° sector centered about central axis 21 (FIG. 1) of the transducer 11.

For a detailed description of the transmitter 13, reference is made to commonly assigned U.S. Pat. No. 5,014,712 issued May 14, 1991 and entitled "Coded Excitation For Transmission Dynamic Focusing of Vibratory Energy Beam" incorporated herein by reference.

Figure 3:
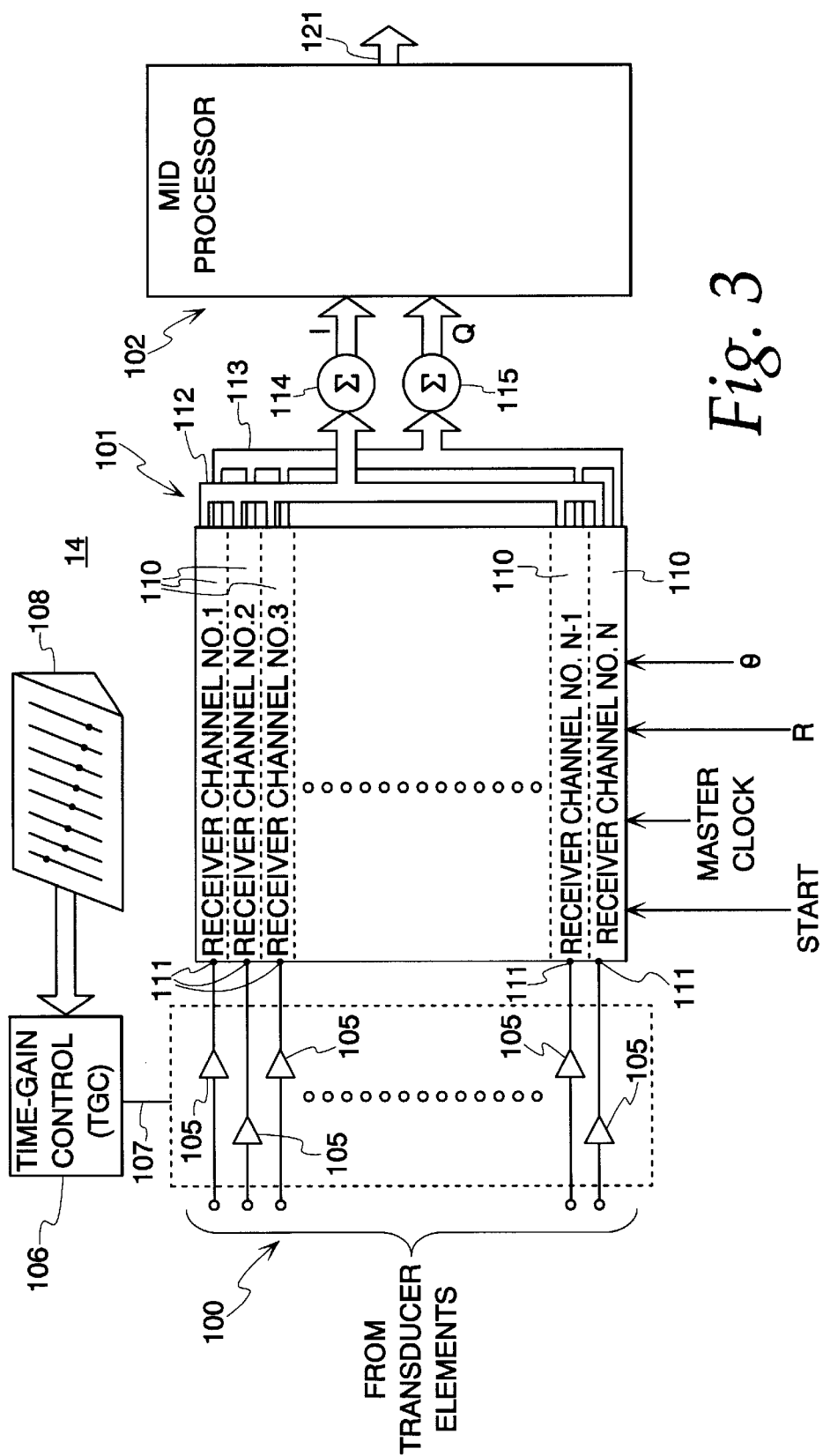
FIG. 3 is a schematic block diagram of a receiver which forms part of the system of FIG. 1.

Referring particularly to FIG. 3, receiver 14 is comprised of these sections: a time-gain control section 100, a receive beam forming section 101, and a mid processor 102. Time-gain control (or TGC) section 100 includes an amplifier 105 for each of the n=128 receiver channels and a time-gain control circuit 106. The input of each amplifier 105 is connected to a respective one of transducer elements 12 to receive and amplify the echo signal which it receives. The amount of amplification provided by amplifiers 105 is controlled through a control line 107 that is driven by TGC circuit 106. As is well known in the art, as the range of the echo signal increases, its amplitude is diminished. As a result, unless the echo signal emanating from more distant reflectors is amplified more than the echo signal from nearby reflectors, the brightness of the image diminishes rapidly as a function of range (R). This amplification is controlled by the operator who manually sets eight (typically) TGC linear potentiometers 108 to values which provide a relatively uniform brightness over the entire range of the section scan. The time interval over which the echo signal is acquired determines the range from which it emanates, and this time interval is divided into eight segments by TGC circuit 106. The settings of the eight potentiometers are employed to set the gains of amplifiers 105 during each of the eight respective time intervals so that the echo signal is amplified in ever increasing amounts over the echo signal acquisition time interval.

The receive beam forming section 101 of receiver 14 includes n=128 separate receiver channels 110. As will be explained in more detail below, each receiver channel 110 receives the analog echo signal from one of amplifiers 105 at an input 111, and it produces a stream of digitized output values on an I bus 112 and a Q bus 113. Each of these I and Q values represents a demodulated sample of the echo signal envelope at a specific range (R). These samples have been delayed and phase shifted such that when they are summed at summing points 114 and 115 with the I and Q samples from each of the other receiver channels 110, they indicate the magnitude and phase of the echo signal reflected from a point P located at range R on the steered beam (θ). In the preferred embodiment, each echo signal is sampled at 150 micrometer increments over the entire range of the scan line (typically 40 to 200 millimeters).

For a more detailed description of receiver 14, reference is made to commonly assigned U.S. Pat. No. 4,983,970, issued Jan. 8, 1991 and entitled "Method And Apparatus for Digital Phase Array Imaging", and U.S. Pat. No. 5,349,524 (Daft et al.) which are incorporated herein by reference.

Referring still to FIG. 3, mid processor section 102 receives the beam samples from summing points 114 and 115. The I and Q values of each beam sample are 20-bit digital numbers representing the in-phase and quadrature components of the magnitude of the reflected sound from a point (R,θ). Mid processor 102 can perform a variety of calculations on these beam samples, where choice is determined by the type of image to be reconstructed.

Figure 4:
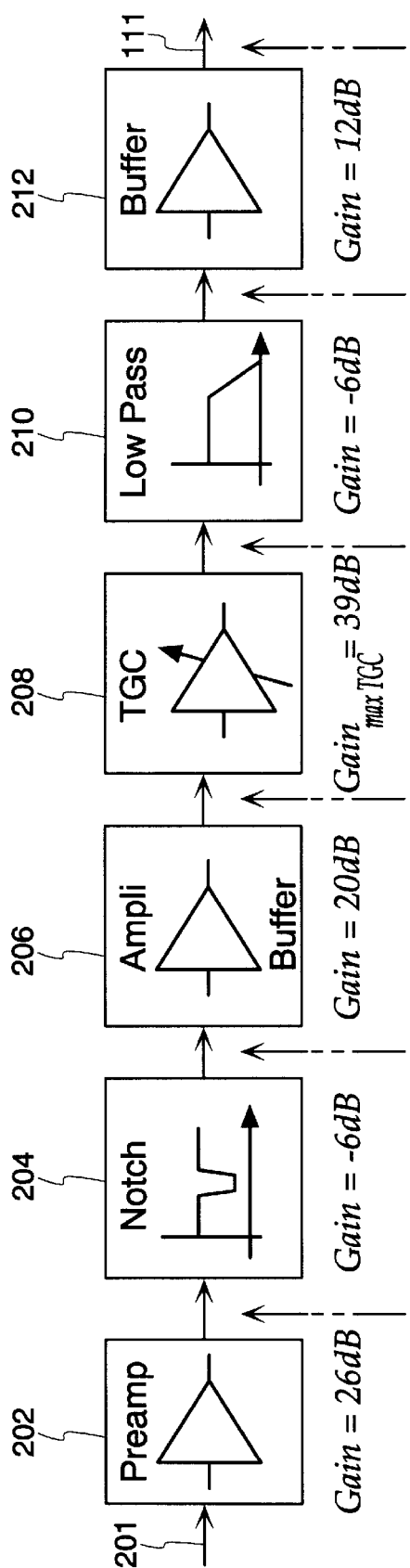
FIG. 4 is a schematic block diagram of a portion of one of the receiver channels shown in the display system which forms part of the system of FIG. 1.

Referring to FIG. 4, each of the amplifiers 105 shown in FIG. 3 basically comprises a preamplifier 202 having a gain of about 26 decibels which receives an input from a conductor 201 that is connected to one of the transducer elements of transducer array 11 shown in FIG. 1. Preamplifier 202 receives echo signals from one of the transducer elements in a well known manner.

The amplified analog signal produced by preamplifier 202 is transmitted to a programmable, band-pass, analog filter 204 preferably comprising a notch filter. Such a notch filter improves the useful dynamic range of the system by eliminating the unwanted strong fundamental band of frequencies present in the echo signals prior to digitization. The notch filter preferably has a gain of approximately minus six decibels.

After filtering by filter 204, the signals are transmitted to a conventional amplifier buffer 206 having a gain of about 20 decibels. The amplified and buffered signals are then transmitted to a conventional time-gain control (TGC) amplifier 208 which receives signals from conductors 107 (FIG. 3). Circuit 208 has a gain of about 39 decibels.

The amplified signals then are transmitted to a conventional low-pass filter 210 which has a gain of about minus 6 decibels. Filter 210 that provides an anti-alias feature. The loss pass filter 210 also may comprise a band pass filter having a lower corner frequency near zero.

The signals from filter 210 are transmitted to a conventional buffer amplifier 212 having a gain of about 12 decibels. The output from buffer amplifier 212 is transmitted to an input 111 (FIG. 3).

Figures 5A, 5B:
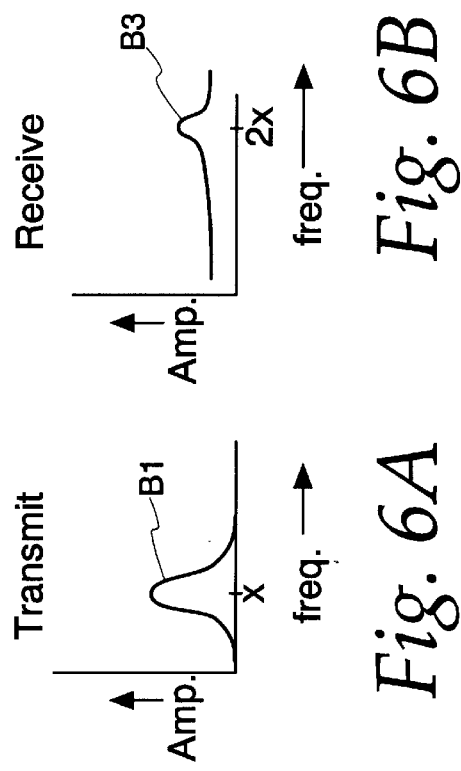
FIGS. 5A and 5B are waveform diagrams illustrating idealized transmit and receive signals known in the art.

As shown in FIG. 5A, the ultrasound signals transmitted from transducer 11 typically have a band of fundamental frequencies, such as B1.

As shown in FIG. 5B, the echo signals generated by transducer array 11 include a band of fundamental frequencies B2 and a band B3 of first harmonics of those fundamental frequencies.

As shown in FIG. 5B, the amplitude of band B3 is substantially lower than the amplitude of band B2. In harmonic imaging for ultrasound, band B2 is unwanted and tends to interfere with the processing of band B3. Notch filter 204 filters band B2 from the echo signals, thereby aiding the processing of the remaining signals.

Figures 6A, 6B:
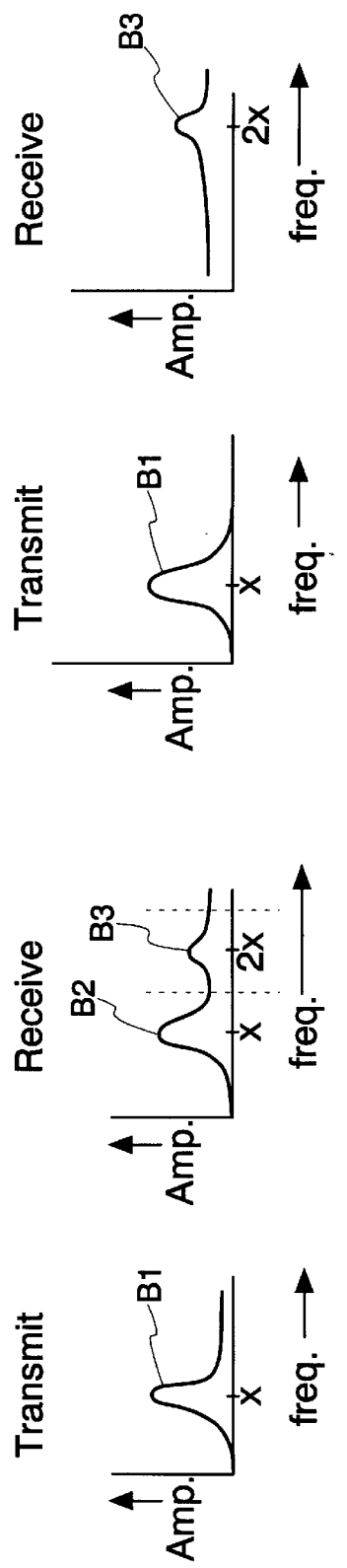
FIGS. 6A and 6B are waveform diagrams illustrating idealized transmit and receive signals achieved by using the preferred embodiment of the invention.

As shown in FIG. 6A, when notch filter 204 is in use, transducer array 11 still transmits the same band of fundamental signals B1 as shown in FIG. 5A. However, as shown in 6B, notch filter 204 removes fundamental frequency band B2, leaving only the first harmonics of the fundamental frequencies in band B3.

In order to achieve the foregoing result, the lower corner frequency of filter 204 is set by the frequency of the lowest desired harmonic. Additional higher harmonics of fundamental band B2 also may be present in the echo signals. If analysis of the higher harmonics is desired, both the fundamental frequencies and the lower harmonics can be eliminated by properly setting the lower corner frequency of filter 204 to the lowest desired harmonic. The upper corner frequency of filter 204 is either determined by the Nyquist frequency or the highest desired harmonic frequency, whichever is lower.

Filter 204 is programmable to accommodate different transmit frequencies in a well known manner by digital controller 16 (FIG. 1).

While only certain preferred features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. In an ultrasound imaging system comprising a receiver connected to receive ultrasound echo signals from a subject under study, the echo signals comprising a first band of frequencies and one or more harmonics of the first band of frequencies, improved apparatus for providing harmonic imaging in response to the echo signals comprising in combination:

an input connected to receive the echo signals;

a beam former;

a filter filtering the first band of frequencies from the echo signals, said filter being coupled between said input and said beam former;

a processor connected to process the filtered signals; and a display unit responsive to the processed signals for displaying one or more images.

2. Apparatus, as claimed in claim 1, wherein the first band of frequencies comprises fundamental frequencies of the echo signals.

3. Apparatus, as claimed in claim 1, wherein the filter comprises a band pass analog filter.

4. Apparatus, as claimed in claim 3, wherein the filter comprises a notch filter.

5. Apparatus, as claimed in claim 3, wherein the filter comprises a programmable filter.

6. Apparatus, as claimed in claim 1, wherein the filter has a lower corner frequency.

7. Apparatus, as claimed in claim 5, wherein the lower corner frequency corresponds to the lowest desired harmonic of the one or more harmonics.

8. Apparatus, as claimed in claim 1, wherein the filter has an upper corner frequency.

9. Apparatus, as claimed in claim 8, wherein the upper corner frequency is determined by the Nyquist frequency or the highest desired harmonic of the one or more harmonics.

10. In an ultrasound imaging system comprising a receiver connected to receive ultrasound echo signals from a subject under study, the echo signals comprising a first band of frequencies and one or more harmonics of the first band of frequencies, an improved method of providing harmonic imaging in response to the echo signals comprising the steps of:

receiving the echo signals;

filtering the first band of frequencies from the echo signals;

beam forming the filtered echo signals;

processing the filtered signals; and displaying one or more images in response to the processed signals.

11. A method, as claimed in claim 10, wherein the first band of frequencies comprises fundamental frequencies of the echo signals.

12. A method, as claimed in claim 10, wherein the step of filtering comprises the step of filtering a band of frequencies.

13. A method, as claimed in claim 12, wherein the step of filtering comprises the step of filtering a notch of frequencies.

14. A method, as claimed in claim 12, wherein the step of filtering comprises the step of changing the parameters of the filtering.

15. A method, as claimed in claim 10, wherein the step of filtering comprises the step of establishing a lower corner frequency for the filtering.

16. A method, as claimed in claim 15, wherein the lower corner frequency corresponds to the lowest desired harmonic of the one or more harmonics.

17. A method, as claimed in claim 10, wherein the step of filtering comprises the step of establishing an upper corner frequency.

18. A method, as claimed in claim 17, wherein the upper corner frequency is determined by the Nyquist frequency or the highest desired harmonic of the one or more harmonics.

* * * * *